(12) United States Patent
Muehge et al.

(10) Patent No.: US 10,705,767 B2
(45) Date of Patent: Jul. 7, 2020

(54) OPTIMIZING USER SATISFACTION WHEN TRAINING A COGNITIVE HIERARCHICAL STORAGE-MANAGEMENT SYSTEM

(71) Applicant: International Business Machines Corporation, Armonk, NY (US)

(72) Inventors: Thorsten Muehge, Budenheim (DE); Stefan M. Ravizza, Wallisellen (CH); Erik Rueger, Ockenheim (DE); Tim U. Scheideler, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/654,840

(22) Filed: Jul. 20, 2017

(65) Prior Publication Data

US 2019/0026048 A1    Jan. 24, 2019

(51) Int. Cl.
*G06F 3/06* (2006.01)
*G06F 16/185* (2019.01)
(Continued)

(52) U.S. Cl.
CPC .......... *G06F 3/0685* (2013.01); *G06F 3/0605* (2013.01); *G06F 3/0649* (2013.01);
(Continued)

(58) Field of Classification Search
CPC ............. G06F 3/0685; G06F 17/30699; G06F 3/0649; G06F 3/0605; G06F 16/185; G06F 16/335; G06N 99/005; G06N 3/08; G06N 20/00
See application file for complete search history.

(56) References Cited

U.S. PATENT DOCUMENTS 7,751,628 B1    7/2010 Reisman
8,966,143 B2    2/2015 Satou
(Continued)

OTHER PUBLICATIONS

Notification Concerning Transmittal of International Preliminary Report on Patentability (Chapter I of the Patent Cooperation Treaty) and International Preliminary Report on Patentability; dated Jan. 30, 2020; PCT/IB2018/055324. 7 pages.

*Primary Examiner* — Glenn Gossage
(74) *Attorney, Agent, or Firm* — Schmeiser, Olsen & Watts; Mark C. Vallone

(57) ABSTRACT

A cognitive hierarchical storage-management system receives feedback describing users' satisfaction with the way that one or more prior data-access requests were serviced. The system uses this feedback to associate each previously requested data element's metadata and storage tier with a level of user satisfaction, and to optimize user satisfaction when the system is trained. As feedback continues to be received, the system uses machine-learning methods to identify how closely specific metadata patterns correlate with certain levels of user satisfaction and with certain storage tiers. The system then uses the resulting associations when determining whether to migrate data associated with a particular metadata pattern to a different tier. Data elements may be migrated between different tiers when two metadata sets share metadata values. A user's degree of satisfaction may be encoded as a metadata element that may be used to train a neural network of a machine-learning module. If detecting that two metadata sets share metadata values, the system determines whether to migrate data elements to different tiers.

20 Claims, 5 Drawing Sheets

(51) Int. Cl.
    *G06N 20/00*    (2019.01)
    *G06N 3/08*     (2006.01)
    *G06F 16/335*   (2019.01)

(52) U.S. Cl.
    CPC .......... *G06F 16/185* (2019.01); *G06F 16/335*
        (2019.01); *G06N 3/08* (2013.01); *G06N 20/00*
                                                    (2019.01)

(56) References Cited

U.S. PATENT DOCUMENTS

| | | | |
|---|---|---|---|
| 9,424,187 B1 | 8/2016 | Todd et al. | |
| 9,477,428 B2* | 10/2016 | Chiu | G06F 3/0647 |
| 9,489,137 B2 | 11/2016 | Lewis et al. | |
| 2008/0021859 A1* | 1/2008 | Berkhin | G06F 17/30221 |
| 2009/0083478 A1 | 3/2009 | Kunimatsu | |
| 2012/0166749 A1* | 6/2012 | Eleftheriou | G06F 3/0616 |
| | | | 711/165 |
| 2013/0024650 A1* | 1/2013 | Ambat | G06F 3/061 |
| | | | 711/209 |
| 2013/0185256 A1* | 7/2013 | Alatorre | G06F 12/02 |
| | | | 707/620 |
| 2014/0149424 A1 | 5/2014 | Kalmes | |
| 2014/0208018 A1* | 7/2014 | Benhase | G06F 12/0866 |
| | | | 711/113 |
| 2014/0304309 A1* | 10/2014 | Diederich | G06F 17/30221 |
| | | | 707/812 |
| 2016/0026404 A1 | 1/2016 | Taylor | |
| 2018/0373722 A1* | 12/2018 | Ulasen | G06N 20/00 |

\* cited by examiner

OPTIMIZING USER SATISFACTION WHEN TRAINING A COGNITIVE HIERARCHICAL STORAGE-MANAGEMENT SYSTEM

BACKGROUND

The present invention relates to the field of computerized storage management and in particular to improving the efficiency, consistency, and predictability of file access in a tiered storage architecture.

In such a tiered environment, virtual or physical storage components may be organized into tiers as a function of each component's performance characteristics. Such tiering may be performed for a variety of reasons, such as to reduce requirements for pricier higher-speed storage devices, to better balance workloads, or to more effectively match a class of storage devices with criticality or access frequency of a type of data stored on that class of device.

In some cases, a request to access data that has been migrated from a higher storage tier to a lower storage tier may take significantly longer to fulfill than it would have taken prior to the migration. Such a degradation in storage performance may produce unacceptable response times. For example, a user that has previously enjoyed quick response when accessing a higher-tier storage device may not find response times of a lower-tier device to be acceptable. Even greater user dissatisfaction may occur when longer access times result from a user's attempt to perform multiple concurrent data-access operations from the same lower-tier storage medium or device.

Current methods of managing migration of data between tiers focus on objective parameters that may be measured by means of known technology, such as response times. They do not account for subjective criteria, such as user satisfaction, which may be a complex or subtle function of multiple factors, such as a class of a requested data item, a class of user or other user characteristic, a location or type of facility of the user, an intended application of the requested data, or even a time of day.

SUMMARY

An embodiment of the present invention provides a cognitive hierarchical storage-management system comprising a processor, a memory coupled to the processor, and a computer-readable hardware storage device coupled to the processor, the storage device containing program code configured to be run by the processor via the memory to implement a method for optimizing user satisfaction when training a cognitive hierarchical storage-management system, the method comprising:

receiving input from a first user that describes the first user's degree of satisfaction with the hierarchical storage-management system's response to a first data-access request, where the first data-access request comprises the first user's request to the hierarchical storage-management system for access to a first data element of a set of data elements, where the response comprises providing, to the first user, access to a copy of the first data element stored on a first storage device of a set of storage devices, and where the first storage device is associated with a first tier of a set of tiers included in a tiered storage environment managed by the hierarchical storage-management system;

identifying a first metadata set associated with the first data element;

associating the first metadata set with the first user's degree of satisfaction, where the associating comprises:

encoding the user's degree of satisfaction as an additional metadata element;

incorporating the additional metadata element into the first metadata set; and submitting the first metadata set as an input vector to a neural network comprised by a machine-learning module of the cognitive hierarchical storage-management system; and migrating the first data element to a second storage device, where the migrating is performed in response to the associating, where the second storage device is associated with a second tier of the set of tiers, and where the first tier and the second tier are distinct.

Another embodiment of the present invention provides a method for optimizing user satisfaction when training a cognitive hierarchical storage-management system, the method comprising:

receiving input from a first user that describes the first user's degree of satisfaction with the hierarchical storage-management system's response to a first data-access request, where the first data-access request comprises the first user's request to the hierarchical storage-management system for access to a first data element of a set of data elements, where the response comprises providing, to the first user, access to a copy of the first data element stored on a first storage device of a set of storage devices, and where the first storage device is associated with a first tier of a set of tiers included in a tiered storage environment managed by the hierarchical storage-management system;

identifying a first metadata set associated with the first data element;

associating the first metadata set with the first user's degree of satisfaction, where the associating comprises:

encoding the user's degree of satisfaction as an additional metadata element;

incorporating the additional metadata element into the first metadata set; and submitting the first metadata set as an input vector to a neural network comprised by a machine-learning module of the cognitive hierarchical storage-management system; and migrating the first data element to a second storage device, where the migrating is performed in response to the associating, where the second storage device is associated with a second tier of the set of tiers, and where the first tier and the second tier are distinct.

Yet another embodiment of the present invention provides a computer program product, comprising a computer-readable hardware storage device storing a computer-readable program code, the program code configured to be executed by a cognitive hierarchical storage-management system comprising a processor, a memory coupled to the processor, and a computer-readable hardware storage device coupled to the processor, the storage device containing program code configured to be run by the processor via the memory to implement a method for optimizing user satisfaction when training the cognitive hierarchical storage-management system, the method comprising:

receiving input from a first user that describes the first user's degree of satisfaction with the hierarchical storage-management system's response to a first data-access request, where the first data-access request comprises the first user's request to the hierarchical storage-management system for access to a first data element of a set of data elements, where the response comprises providing, to the first user, access to a copy of the first data element stored on a first storage device of a set of storage devices, and where the first storage device is associated with a first tier of a set of tiers comprised by a tiered storage environment managed by the hierarchical storage-management system;

identifying a first metadata set associated with the first data element;

associating the first metadata set with the first user's degree of satisfaction, where the associating comprises:

encoding the user's degree of satisfaction as an additional metadata element;

incorporating the additional metadata element into the first metadata set; and submitting the first metadata set as an input vector to a neural network comprised by a machine-learning module of the cognitive hierarchical storage-management system; and migrating the first data element to a second storage device, where the migrating is performed in response to the associating, where the second storage device is associated with a second tier of the set of tiers, and where the first tier and the second tier are distinct.

DETAILED DESCRIPTION

Figure 1:
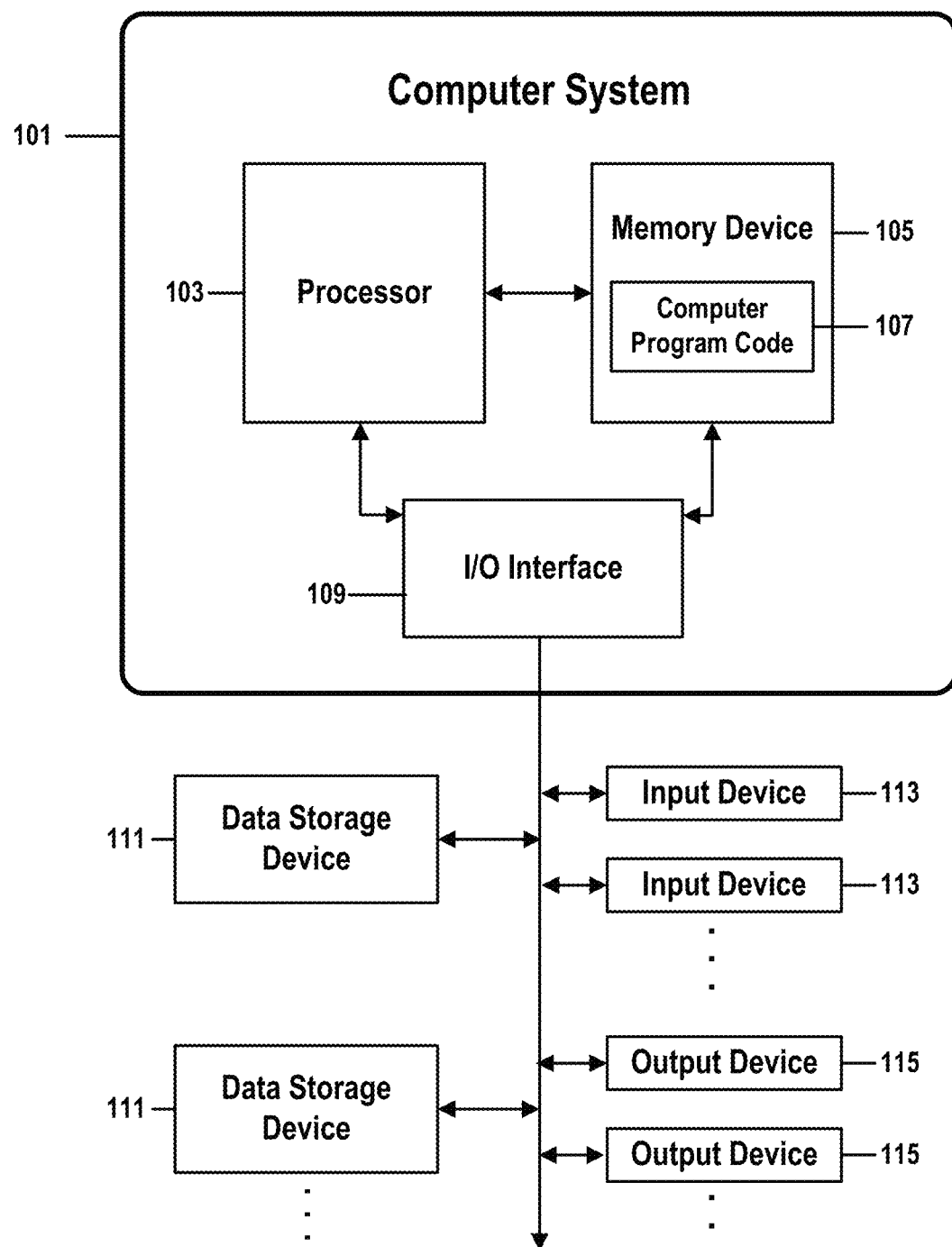
FIG. 1 shows the structure of a computer system, including computer program code that may be used to implement a method for optimizing user satisfaction when training a cognitive hierarchical storage-management system in accordance with embodiments of the present invention.

The present invention provides a technical solution to a technical problem that is necessarily rooted in computerized data-storage technology. In particular, the present invention increases the efficiency, consistency, and predictability of file access in a tiered storage environment by considering user satisfaction with data-access times.

This document includes certain examples and describes certain embodiments of the present invention in which storage devices or storage media are organized into tiers, and in which data is directed to storage in a particular tier, as a function of a storage device's or a storage medium's performance characteristics, or as a function of users' response-time requirements for the data. But these examples and exemplary embodiments should not be construed to limit embodiments of the present invention to such factors.

In tiered storage environments within the scope of the present invention, virtual or physical storage components may be organized into tiers as a function of each component's read speed, write speed, average access time, storage capacity, cost per unit of stored data, reliability, robustness, or other characteristic of the component. Similarly, a data item is assigned to a particular tier as a function of expected response-time requirements of that data, expected frequency of access of the data, criticality of the data, security requirements of the data, a storage capacity required to store the data, or any other factor that is deemed by an implementer to best satisfy user requirements for accessing the data item.

A request to access data that has been migrated from a 'higher' (such as a faster) storage tier to a 'lower' (such as a slower) storage tier may result in data-access requests taking longer to fulfill than they would have taken prior to the migration. Users may find access times particularly unsatisfactory when retrieving data from a lower-tier storage device that is very slow, that cannot easily serve multiple concurrent users, or that, like a tape unit, requires physically mounting a storage medium.

These problems are necessarily rooted in tiered, computerized, data-storage technology and embodiments of the present invention provide a technical solution that addresses these problems. This technical solution may comprise a technology like a machine-learning system capable of designing, implementing, or managing a tiered storage architecture.

In particular, embodiments of the present invention comprise a self-learning system, such as a neural network or an artificially intelligent computer application. This self-learning system analyzes user-satisfaction feedback to dynamically assign or migrate data sets among different tiers of storage devices. The self-learning system may be initially trained by submitting to the neural network a series of training data sets generated from feedback received from a large ensemble of users.

The goal of this training is to teach the system how to determine the most effective and cost-effective way to associate a data item with a particular storage tier, and to make this determination as a function of user-satisfaction feedback and of metadata associated with the data item. Such metadata might, for example, comprise: a frequency at which the data element is updated, a time at which the element was last accessed or modified, a size of the data element, a characteristic of a user or user group that requested access to the data element, or a filename, pathname, location, or data type of the data element.

Once the neural network has learned how to correctly organize the data as a result of the training data sets, the system will then be capable of dynamically optimizing user satisfaction by organizing elements of real-world data into tiers, as a function of metadata associated with each data element.

Embodiments of the present invention may adapt the underlying inventive concept of the present invention to other applications and technical fields in which data may be stored in or accessed from different sources. One example of such an application is a wide-area network (WAN) that supports both local and remote data caches. In such an example, the present invention may be used to determine when cached data should be migrated to a different location.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to implement embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows the structure of a computer system, including computer program code that may be used to implement a method for optimizing user satisfaction when training a cognitive hierarchical storage-management system in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGAs), SECURE DIGITAL® (SD®) memory cards, Subscriber Information Module (SIM) cards, or other types of memory devices.

At least one memory device 105 contains stored computer program code 107, which is a computer program that comprises computer-executable instructions. The stored computer program code includes a program that implements a method for optimizing user satisfaction when training a cognitive hierarchical storage-management system in accordance with embodiments of the present invention, and may implement other embodiments described in this specification. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for optimizing user satisfaction when training a cognitive hierarchical storage-management system.

Any of the components of the present invention could be created, integrated, hosted, maintained, deployed, managed, serviced, supported, etc. by a service provider that offers to facilitate a method for optimizing user satisfaction when training a cognitive hierarchical storage-management system. Thus the present invention discloses a process for deploying or integrating computing infrastructure, comprising integrating computer-readable code into the computer system 101, wherein the code in combination with the computer system 101 is capable of performing a method for optimizing user satisfaction when training a cognitive hierarchical storage-management system.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for optimizing user satisfaction when training a cognitive hierarchical storage-management system may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for optimizing user satisfaction when training a cognitive hierarchical storage-management system is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
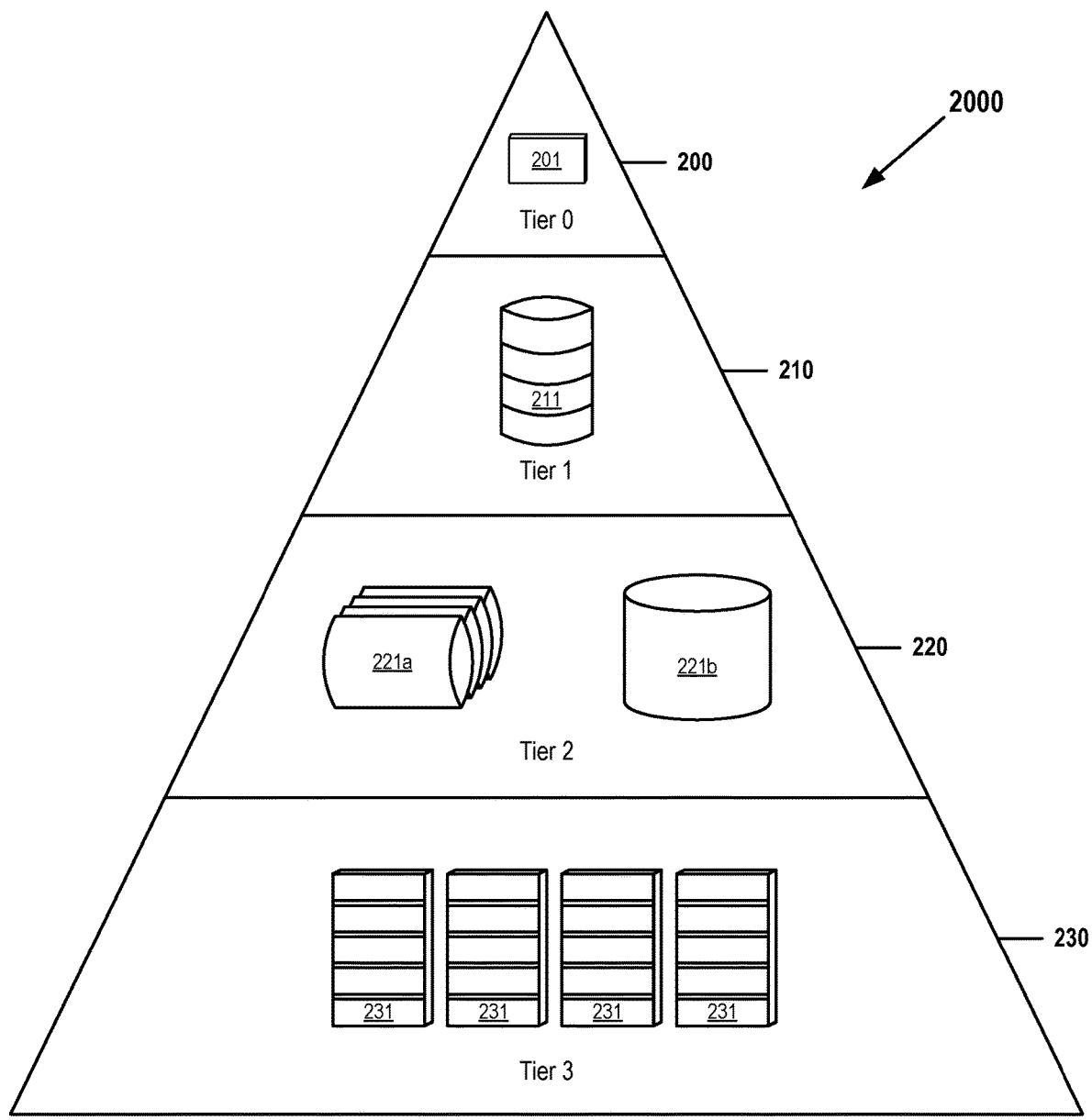
FIG. 2 shows an example of a conventional tiered storage architecture.

FIG. 2 shows an example of a conventional tiered storage architecture 2000. FIG. 2 shows elements identified by reference numbers 200-231 and 2000.

In this example, storage devices accessed by an enterprise system, a cloud-computing platform, or another multi-user computerized environment are organized into four tiers. Tier 0 200 comprises the fastest storage devices, such as solid-state discs 201 and cache storage. Tier 1 210 comprises the next-fastest storage devices, such as high-speed RAID arrays 211, or higher-performance rotating-media disk drives.

Similarly, Tier 2 220 comprises the next-fastest group of storage devices, such as medium-speed higher-capacity hard drives, large disaster-recovery backup media 221*a*, dedicated database servers 221*b*, or email servers. Finally, Tier 3 230 comprises the slowest storage resources, such as optical-disc arrays 231 or archival storage media like magnetic tape, some of which may require a mounting procedure in order to be accessed on-demand.

The architecture of FIG. 2 is but one example of how storage may be tiered. In other applications, storage devices and media may be organized into tiers as a function of storage cost, with lower-priority (in this example, higher-numbered) tiers comprising less-expensive storage. In other applications, a tiered storage architecture may organize storage devices into more than 4 tiers or into fewer than 4 tiers.

In yet other applications, tiers may be arbitrarily assigned different names than those used in the example of FIG. 2. For example, a three-tier storage architecture may comprise tiers named "Gold Storage," "Silver Storage," and "Bronze Storage."

Such tiered storage is most common in environments that configure storage media as network-attached storage (NAS) devices, but this is not an essential requirement. Embodiments of the present invention may be applied to any sort of storage architecture, so long as storage devices or media included in that architecture are capable of being organized into tiers, as a function of whatever factors deemed important by implementers.

In certain known applications, a choice of tier into which to store a particular type of data may be determined as a function of predefined rules or policies. A policy may, for example, dictate that database backups be stored in a slower ("lower") Tier 2 high-capacity hard drive or that streaming-video files be stored on a faster ("higher") Tier 0 device.

In some cases, other rules or policies may determine when and how data might be migrated from one tier to another. Such a migration might be performed, for example, when a size of a database exceeds a threshold specified by a previously determined policy, or when an average database access frequency falls below a threshold specified by a previously determined policy. In such an example, the previously determined policy might require that database to be migrated to a higher-capacity, but lower-performance, device residing in a "lower" tier. In another example, a large electronic encyclopedia might be migrated from a higher-performance device in a higher tier to a lower-performance device in a lower tier when a specified period of time elapses during which no user requests access to the encyclopedia.

Figure 3:
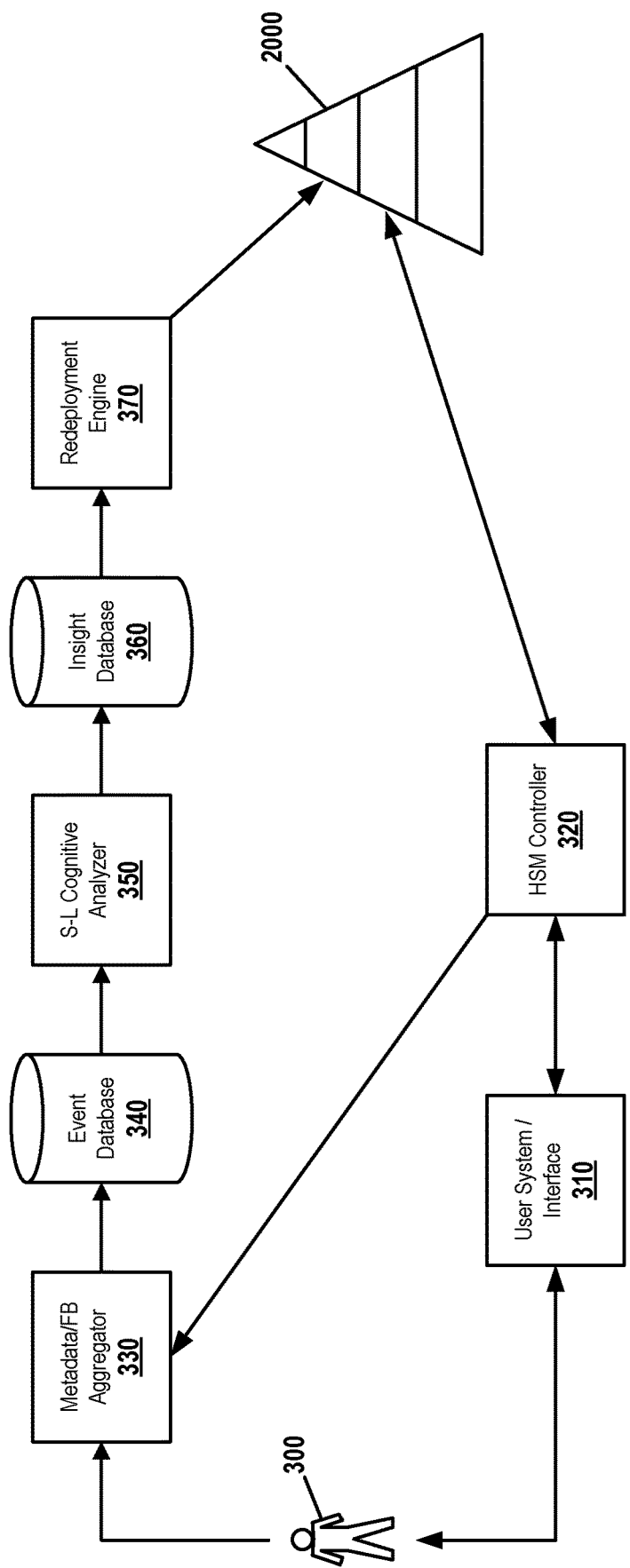
FIG. 3 shows an architecture of a storage management system in accordance with embodiments of the present invention.

FIG. 3 shows an architecture of a storage management system in accordance with embodiments of the present invention. FIG. 3 shows elements identified by reference numbers 300-370 and 2000.

The system of FIG. 3 allows a user 300 to retrieve data stored in a tiered storage environment 2000 by using a device, workstation, or other interfacing device 310 to request data access from a hierarchical storage-management (HSM) controller 320. HSM controller 320 then retrieves the requested data from a storage device organized into one of the tiers of hierarchical storage environment 2000, and returns the retrieved data to the user system 310. Operations in which user 300 stores data in a tier of storage environment 2000 or modifies data already stored in a tier of storage environment 2000 may be performed by an analogous mechanism.

In embodiments of the present invention, a metadata/feedback aggregator 330 monitors these data-access operations, recording each user-initiated transaction and receiving from the HSM controller 320 a set of metadata that identifies characteristics of the accessed data item.

Aggregator 330 may also receive user feedback about a completed transaction. Such feedback may take any form desired by an implementer, and in simplified embodiments and examples described in this document, this feedback may be represented by an alphanumeric numeric code. For example, user feedback of 0 may indicate dissatisfaction with the system's access time during a transaction, feedback of 1 may indicate a neutral response, and feedback of 2 may indicate that the user was satisfied with the system's data-access performance.

Other known coding mechanisms are possible, including those that use more than or fewer than three possible code values, or that use more complex codes that may comprise more than one character or a set of functions. In all cases, however, aggregator 330 will assemble a data pair for each user transaction, where that pair consists of a set of metadata and a user-feedback value. The aggregator 330 then stores this data pair in an event database 340.

A self-learning cognitive analyzer 350 then, by means of known methods of machine-learning and artificial intelligence, uses the aggregated data pairs to refine its learning algorithms and its storage-management models. These algorithms and models, stored in an insight database 360, determine how redeployment engine 370 will organize data in the storage environment 2000. In embodiments shown in FIG. 3, the insight database 360 may comprise decision trees that determine how and when to reorganize data or storage devices among tiers of storage environment 2000.

For example, if the cognitive analyzer 350 receives a large amount of unsatisfactory user feedback when accessing a database stored in Tier 2 of storage environment 2000, the analyzer may, by known analytical means, infer from metadata stored in event database 340 a correlation between a number of concurrent accesses of that database and low user satisfaction. In response, the cognitive analyzer 350 may update its storage-management rules and inferential insights stored in insight database 360. Redeployment engine 370, in response to the revision of the decision-making rules stored in insight database 360, would then move the most frequently accessed database files from Tier 2 of storage environment 2000 to a Tier 1 RAID array capable of higher performance when responding to concurrent data-access requests.

In this manner, embodiments of the present invention continuously improve their storage-management procedures, and continuously revise their data-migration rules as functions of subjective user satisfaction ratings and of objective metadata characteristics of stored data.

Figure 4:
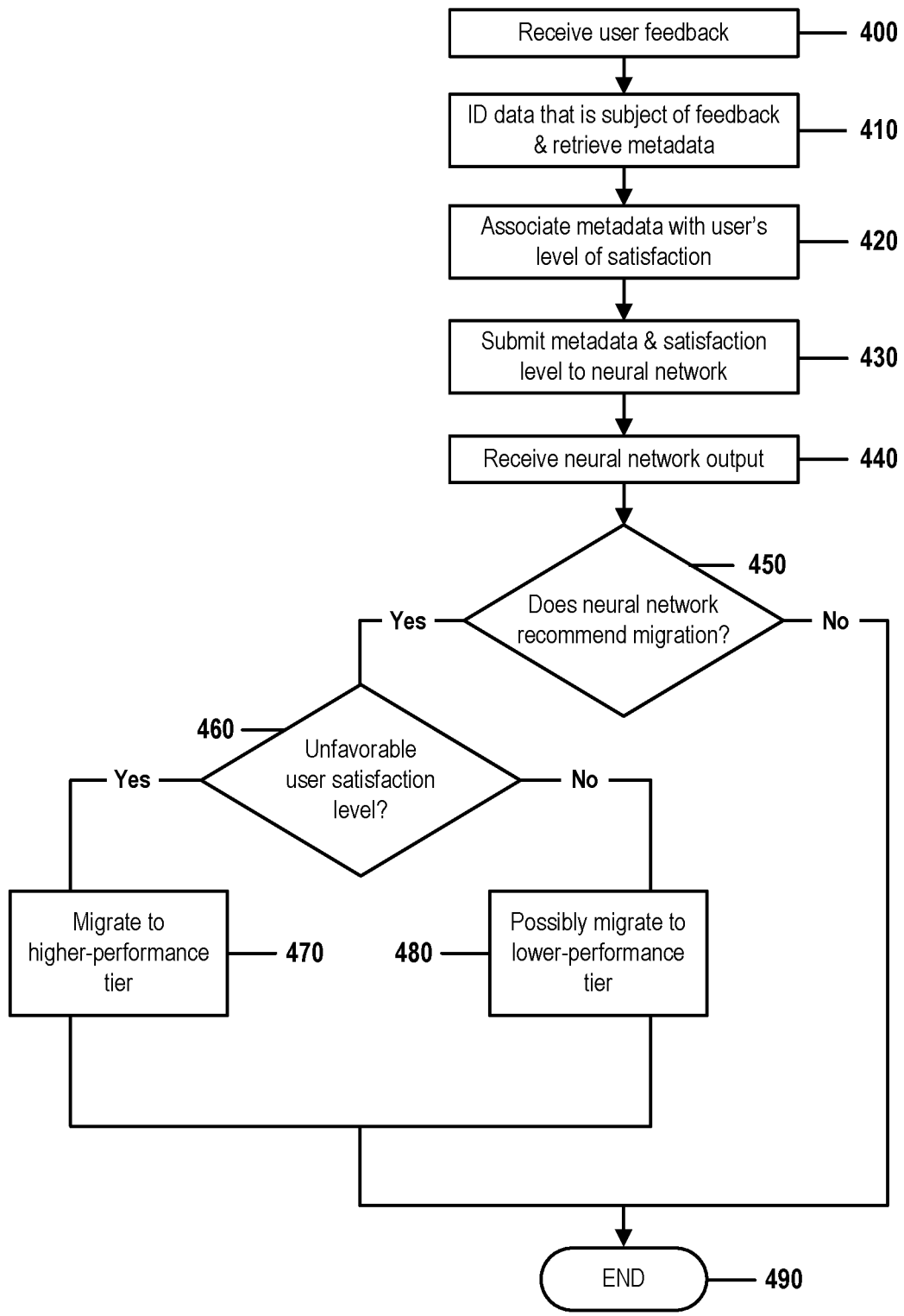
FIG. 4 is a flow chart that illustrates the steps of a method for optimizing user satisfaction when training a cognitive hierarchical storage-management system in accordance with embodiments of the present invention.

FIG. 4 is a flow chart that illustrates the steps of a method for optimizing user satisfaction when training a cognitive hierarchical storage-management system in accordance with embodiments of the present invention. FIG. 4 contains steps 400-490.

The method of FIG. 4 comprises a methodology for training a cognitive hierarchical management system. Such a cognitive system does not associate a data set with a particular tier by simply following static rules or by detecting that a certain parameter has exceeded a predefined threshold value. Instead, compliant systems continuously self-adjust dynamic tiering rules by correlating accessed data's metadata with feedback received from a large ensemble of users.

This feedback reports subjective levels of user satisfaction with previous data-access operations, thus allowing compliant self-learning systems to manage tiered storage (like that of FIG. 2) as a function of user satisfaction, rather than of objective performance measurements like latency times or occurrences of hard faults. Since the ultimate goal of a tiered-storage management system is to increase subjective levels of user satisfaction, training the system to make tiering decisions based on user-satisfaction levels is a more accurate and direct way to achieve this goal.

In the embodiment of FIG. 4, the cognitive storage-management system comprises a neural network that is trained by input vector comprising user feedback about a prior attempt to access a data element and metadata that describes characteristics of that data element. This allows the neural network to associate user-satisfaction levels with certain metadata patterns, and to thus determine whether data associated with similar metadata should be migrated to a faster (or slower) tier in order to optimize user satisfaction, storage costs, and technical constraints.

The method of FIG. 4 should not be construed to limit embodiments of the present invention to systems that employ methods of machine-learning based on neural networks. The present invention is flexible enough to accommodate any sort of machine-learning or cognitive-system training methodology known in the art.

Nor should the present invention be construed to be limited to hierarchical storage-management systems. As shown by the exemplary system of FIG. 5, the cognitive-system training methodology described in FIG. 4 may be adapted to other sorts of systems and applications, such as a cognitive router, network switch, or other network appliance; a cached storage system of a WAN, cloud, enterprise network, or other type of distributed computing system; a fluid-distribution network; or a cellular-communications network-management system.

In step 400, a cognitive hierarchical storage-management system receives user feedback that describes one or more users' levels of satisfaction with the system's responses to previous data-access requests.

This feedback may be entered, transmitted, and delivered by any means known in the art. In one example, a user might use a computer workstation or a mobile device to complete an electronic user-satisfaction survey after a particular data-access operation, and the results of that survey would then be transmitted to the system via a computer network or a cellular network. In another example, a user may fill out a hand-written form, which is then manually entered by a data-entry operator.

The feedback may be formatted by any means known in the art. Certain embodiments may attempt to streamline the feedback process, reduce storage requirements, and reduce the burden on users by merely requesting a user to describe a level of satisfaction as "satisfactory," "unsatisfactory," or "neutral—neither satisfactory nor unsatisfactory." In other cases, a system might be configured to accept a greater or lesser number of possible satisfaction levels, different types of levels, or freeform natural-language text from which meaning may be inferred by a natural-language processing (NLP) module.

In other embodiments, the feedback may allow a user to identify a reason for a user's satisfaction level, such as "unacceptably slow response time" or "failure to accurately predict estimated delivery time."

In step 410, the system identifies each data element or set of data elements that are subjects of user feedback received in step 400. The system then retrieves metadata associated with each data element or data set of interest.

The exact format and contents of a single data element's metadata may be a function of the operating system or hardware on which the data is stored. Furthermore, embodiments of the present invention may, if so desired by an implementer, retrieve only a subset of the metadata that is available.

Elements of metadata may have been originally created and stored by any means known in the art, such as by a host operating system or cloud service directory, or read directly from storage controllers. As in step 400, metadata may be transmitted to and received by the system through any means known in the art, such as by means of a computer network.

Table 1 comprises an example of a typical set of metadata that describes a file that was accessed as part of a larger database fileset.

TABLE 1

Example of data element metadata

| Metadata | Description |
| --- | --- |
| ctime | Current date and time |
| atime | Date and time at which the file was last accessed |
| mtime | Date and time at which the file was last modified |
| dname | Database name |
| fname | Filename |
| path | File path |
| size | File size |
| ext | Filename extension |
| uid | User ID |
| gid | User's workgroup ID |

In the example of FIG. 4, user feedback would contain one instance of the metadata of Table 1 for each previously accessed data item identified in step 400. In other embodiments, different types of metadata might be received, but in all cases, each previously accessed data item would be associated with no more than one set or subset of metadata.

In step 420, the system associates the metadata of each data item identified in step 410 with a level of user satisfaction, identified in step 400, with the system's response to a request to access that data item.

Embodiments of the present invention are flexible enough to accommodate any means of associating the metadata with the level of user satisfaction that is known in the art. In the simple example of FIG. 4, user feedback that is formatted as a single-digit alphanumeric code might be added to each metadata instance as an additional metadata element. Such an addition might have no effect on a standard way in which a system or systems store metadata, but would instead constitute an enhanced data structure that comprises both a subset of available metadata and a user-satisfaction rating. Each instance of such an enhanced data structure would be associated with a particular data item, a particular data-access request, and a particular user.

In step 430, the system submits each enhanced data structure assembled in step 420 to the cognitive hierarchical-storage management system as a means of training the system. This submission may be performed by any means known in the art, but in the example of FIG. 4, where the system comprises a machine-learning module based on a neural network, the submission would be made by submitting the enhanced data structure as an input vector of the neural network.

Table 2 illustrates one example of such input vectors. In this example, user feedback received in step 400 had specified user-satisfaction levels capable of being encoded as one of three values: 0 (unsatisfactory), 1 (neutral), or 2 (satisfactory).

Each row of Table 2 identifies one neural-network input vector, which comprises a user-satisfaction code (column 1) and 9 elements of metadata (columns 2-10). Because each vector comprises ten data fields, each vector has a dimension of 10. Input vectors may, however, have any dimensionality desired by an implementer, so long as a neural network or other cognitive program is capable of receiving the vector as input. In other embodiments, each metadata/user-satisfaction data structure associated with one data-access operation identified by feedback received in step 400 may take different or more complex forms, depending on the requirements of the cognitive software module that processes the data structure.

In the example of Table 2, the first row identifies metadata and a user-satisfaction level of a data-access request made by user "1000" (identified by the "uid" field) of workgroup "2456" (identified by the "gid" field). This access request requested access to a data file identified by a link "2315" (specified by the "nlink" field) and specifies that the user had a neutral reaction (identified by "response" value of "1") to the system's response to the request.

Each subsequent row of Table 2 identifies a similar set of data for another data-access operation identified by the user feedback received in step 400.

TABLE 2

| | | | | Examples of input vectors | | | | | |
|---|---|---|---|---|---|---|---|---|---|
| response | atime | ctime | mtime | blocks | blksize | size | nlink | uid | gid |
| 1 | 7200 | 6014 | 15012 | 95674 | 512 | 8825088 | 2315 | 1000 | 2456 |
| 0 | 3500 | 5120 | 5120 | 1278 | 128 | 16227 | 567 | 512 | 2343 |
| 1 | 35023 | 41122 | 41122 | 1298761 | 512 | 664965632 | 56 | 1456 | 2139 |
| 0 | 7901 | 11306 | 12446 | 125 | 256 | 32000 | 14823 | 1346 | 2656 |
| 0 | 67339 | 70112 | 71119 | 1456 | 256 | 60150 | 342 | 1745 | 2314 |
| 2 | 35090 | 41989 | 41989 | 234850378 | 128 | 5808384 | 789 | 1421 | 2657 |
| 2 | 81321 | 90229 | 91965 | 1234959803 | 64 | 2942720 | 436 | 1775 | 2897 |
| 0 | 1203 | 1203 | 1203 | 3417 | 128 | 437376 | 3156 | 324 | 2998 |
| 1 | 132943 | 140859 | 600859 | 871890 | 512 | 1939968 | 12800 | 1737 | 2759 |
| 0 | 6540 | 6540 | 6540 | 3451 | 512 | 176691 | 342 | 1264 | 2453 |
| 1 | 3942 | 4021 | 3981 | 994701 | 64 | 2810781494 | 2576 | 1693 | 2188 |

In the embodiments and examples of FIG. 4, the system submits each input vector assembled in step 420 to the neural network or other module of the cognitive hierarchical-storage management system. But, as described earlier, these embodiments and examples should not be construed to limit the present invention to machine-learning applications that comprise steps of training a neural network.

In step 440, the system receives an output vector from the neural network (or other trainable cognitive model) in response to each input vector submitted in step 430. These output vectors may take any form desired by an implementer, or defined by an operation of the neural network or other trainable module.

In the simple example of FIG. 4, each output vector may comprise a one-dimensional alphanumeric value that identifies a storage tier to which a corresponding data element is to be migrated. In these examples, the neural network or other cognitive module uses known methods of artificial intelligence or machine learning to determine which storage tier would best suit a particular data item.

For example, a subset of the input vectors submitted in step 430 may identify that a majority of users are dissatisfied with response times when requesting access to tables of a particular database that exceed 1 megabyte (Mbyte) in size, when those requests are made from workgroups physically located in the United Kingdom. In this example, the system might respond by specifying that all large tables of that particular database be migrated from a slower Tier-2 storage device to a faster Tier-1 device. This recommendation might extend even to large tables of that database that were not subject to any data-access request identified by user feedback received in step 400. The cognitive system in this case would have, using known methods of artificial intelligence, learned from the user feedback that it is likely that users will be dissatisfied when attempting to access any large file comprised by the particular database and will attempt to preempt such problems before they occur by moving all files to a faster storage tier.

Variations of this methodology are within the scope of the present invention. For example, the system may return an output vector that merely indicates that a data item should be migrated to a faster tier. In another example, if users report overwhelmingly positive satisfaction levels that exceed expectations when accessing data associated with a certain subset of metadata values, the system may return a more complex response recommending that all data associated with identical or similar metadata subsets be migrated to a less-expensive, but slower, tier.

In all cases, the input vectors submitted to the cognitive system in step 430 serve to train the system to more intelligently identify an optimal storage tier for certain data elements, and to base that intelligent identification upon subjective user levels of satisfaction, rather than on objective system-performance specifications or other objective measurements.

In step 450, the system determines whether the output received from the cognitive system in step 440 requires that data be migrated to a different tier. If the system determines that no migration is necessary, the method of FIG. 4 concludes with step 490, resuming only when additional user feedback is received. When such additional feedback is received, the method of FIG. 4 resumes with a next iteration of step 400, and the additional feedback is used to further train the cognitive system.

The procedure of steps 450-480 is repeated for each data item identified by the system as being capable of being migrated. In some embodiments, this procedure is repeated for each data item associated with a data-access request by the feedback received in step 400 (or, similarly for each data item associated with an input vector submitted to the system in step 430).

In other embodiments, the procedure is also repeated for additional data items identified by output generated by the system in step 440, even if those additional items were not the subjects of access requests identified by received feedback, but were instead identified by the cognitive system as being associated with certain metadata values of certain data items that had been the subject of access requests identified by feedback.

In other words, embodiments of the present invention may, by inferring meaning from certain patterns of metadata values identified by the training procedure of steps 400-430, learn that additional data items should be migrated because those additional data items are associated with the same patterns.

If the system in step 450 determines that the output generated in step 440 recommends a data migration, the method of FIG. 4 continues with steps 460-480.

In step 460, the system determines whether a user-satisfaction level is unfavorable and whether to possibly migrate each data item to a faster storage tier or to a slower storage tier. As described above, if the system in step 450 identifies that user-satisfaction levels are unacceptably low when attempting to access a particular data item, under particular conditions identified by a subset of metadata elements, the system in step 470 migrates that particular data item to a faster storage device located in a higher-performance storage tier. Conversely, if the system in step 450 identifies that user-satisfaction levels for a particular data item are so high that users might be able to tolerate lower data-access performance, the system in step 480 might migrate that particular data item to a slower storage device located in a lower-performance storage tier.

In either case, the system might in step 470 or 480 initiate a data migration by directing one or more storage controllers of the hierarchical storage pool to perform a data migration by physically moving data from a storage device in one tier to a storage device in another tier. In some embodiments, this migration may be performed immediately, but in other embodiments, the migration may be scheduled for a future time or date, as required by other business or technical constraints.

In certain embodiments, the hierarchical storage-management system may comprise hardware or software capable of performing the actual data migration. In such cases, the system may in step 470 or 480 physically move data from one tier to another, either immediately or at a scheduled future time.

Figure 5:
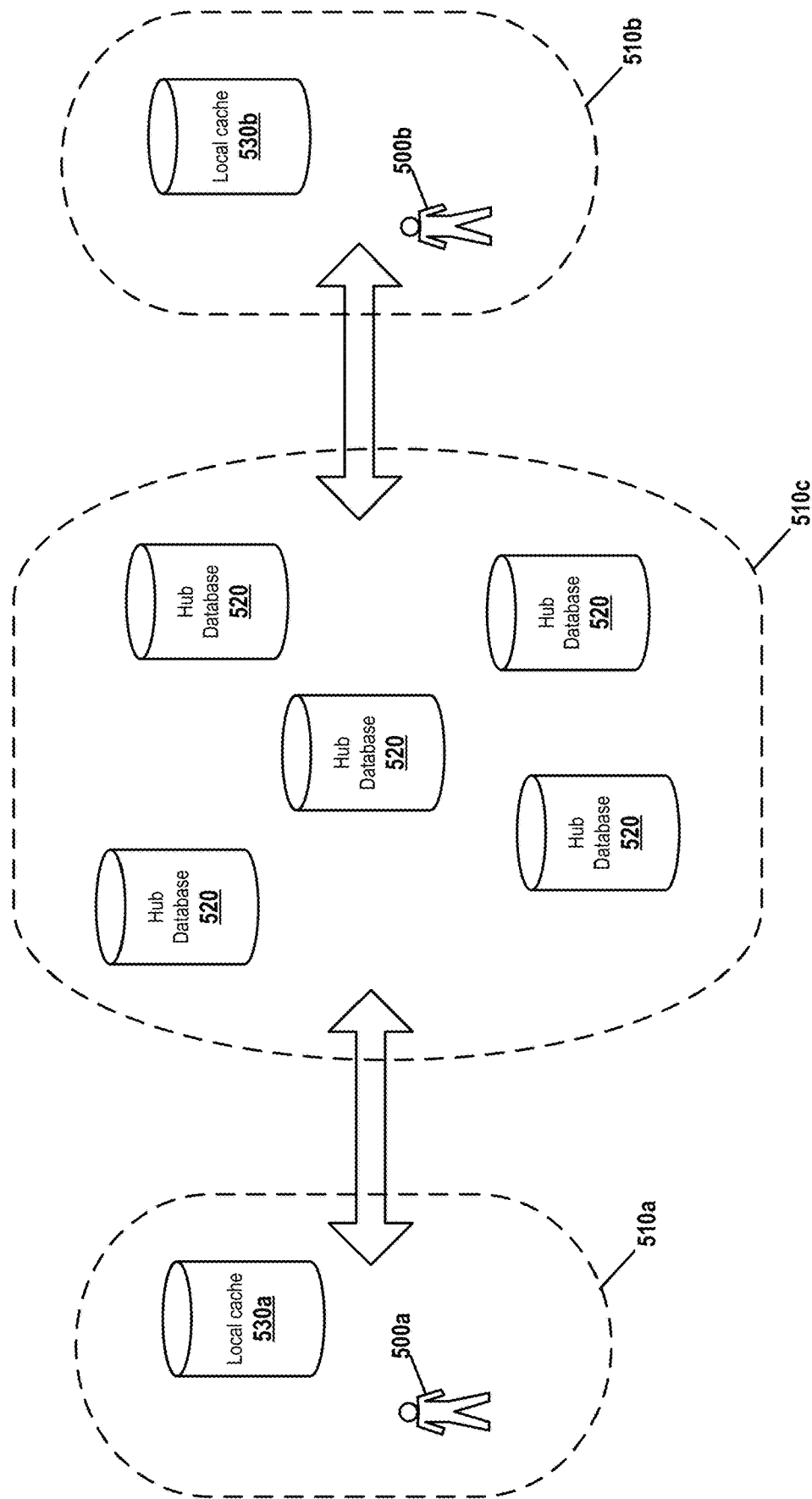
FIG. 5 shows an architecture of a cached WAN storage environment in which embodiments of the present invention may be implemented.

FIG. 5 shows an architecture of a cached WAN storage environment in which embodiments of the present invention may be implemented. FIG. 5 shows elements identified by reference numbers 500a-530b.

Although some examples and embodiments of the present invention discussed in this document describe implementations that support hierarchical-storage environments and network-attached storage (NAS), many other types of embodiments are possible.

The method of FIG. 4 may, for example, be applied to cached wide-area network (WAN) environments. In such cases, data stored on central "home" servers may be cached at remote locations, such as branch offices. This mechanism allows a branch office to more quickly access copies of cached data stored on the cache servers. However, because such caching requires additional cost and computing resources, it may be cost-effective to cache only certain types of mission-critical data.

By viewing such an architecture as analogous to the tiered-storage environment of FIG. 2, embodiments of the present invention may be adapted to determine which data should occupy cached storage media and which should reside only at the central hub. Although in this case, user satisfaction is more likely to be a function of network bandwidth than of storage-device performance, underlying methods of the present invention operate in a similar way. After receiving feedback that identifies levels of user satisfaction with previous data-access operations, a cognitive distributed storage-management system may, as a function of metadata and user feedback, determine whether to migrate particular data items between a central hub server (which may provide longer access times) and a local caching server (which may provide higher performance).

In some embodiments, the system may further adapt methods of FIG. 4 to determine whether and how often particular data items stored on a central hub server should be synchronized with, rather than migrated to, a cache located at a remote, WAN-connected, site like a branch office.

In the example of FIG. 5, a wide-area network is shown that comprises a central hub 510c that is connected through the WAN to two remote branch offices 510a and 510b. A set of hub servers 520 are physically located at central hub 510c.

User 500a, physically located at branch office 510a, may access data physically stored at the hub 510c through the network and user 500b, physically located at branch office 510b, may similarly access data physically stored at the hub 510c through the network. However, data-access times through the wide-area network may be slow. Data stored on the hub servers 520 is thus copied to local cache servers 530a and 530b, each of which is located at its respective branch office 510a or 510b. Because a user 500a or 500b physically located at a branch office 510a or 510b can access data stored locally on a cache server 530a or 530b, without the delays inherent in WAN transfers, locally cached data may be considered a higher-performance storage medium than data stored at the hub.

This mechanism can only work if the local cache servers 530a and 530b are periodically refreshed or synchronized with the hub databases on hub servers 520. Synchronization through the WAN, however, can be time-consuming and expensive, so synchronization frequency must be tailored to effect a best compromise between user satisfaction levels and technical or cost constraints. There must thus be a means of determining when data should be synchronized (in effect, "migrated") between the hub servers 520 and the local cache servers 530a and 530b.

A cognitive WAN-storage management system may thus employ a method similar to that of FIG. 4 in order to determine the best time to synchronize each type or class of cached data, as a function of user-satisfaction feedback and of cached-data metadata. In embodiments in which cached data is not only read-only data, methods of the present invention may be adapted to manage bidirectional synchronization between branch-office caches and centralized hub data-storage devices.

Although not described in this document, yet other embodiments of the present invention are also possible. For example, a tape-library management system may adapt the methods of FIG. 4 to optimize performance of data requests that require tape retrieval and mounting. Such optimization might comprise determinations, based on user feedback and metadata of data items stored on tape, of the actual positions of data items on a tape, or of a selection of which tapes on which to store certain data items. These determinations may be analogous to determinations of a storage tier or of a WAN server location because a sequential-access medium like tape (or certain types of optical discs) can more quickly access data stored at certain locations on the medium. Similarly, accessing offline data stored in a media library can be performed more quickly when data is archived on a particular storage medium (like a certain tape) that may be more quickly located and mounted than if the data was stored on an infrequently accessed medium, like a tape that has been warehoused for long-time storage.

What is claimed is:

1. A cognitive hierarchical storage-management system, comprising a processor, a memory coupled to the processor, and a computer-readable hardware storage device coupled to the processor, the storage device containing program code configured to be executed by the processor via the memory to implement operations for optimizing user satisfaction when training the cognitive hierarchical storage-management system, the operations comprising:

receiving, by the processor, feedback from a first user that describes the first user's degree of satisfaction with the hierarchical storage-management system's response to a first data-access request,
  where the first data-access request comprises the first user's request to the hierarchical storage-management system for access to a first data element of a set of data elements, and
  where the response comprises providing, to the first user, access to a copy of the first data element stored on a first storage device of a set of storage devices, the first storage device being associated with a first tier of a set of tiers of a tiered storage environment managed by the hierarchical storage-management system;

identifying a first metadata set associated with the first data element;
associating the first metadata set with the first user's degree of satisfaction,
  where the associating comprises:
    inferring meaning from a pattern of metadata values of the first metadata set, where the meaning consists of a correlation between a degree of user satisfaction and at least one metadata value of the first metadata set,
    updating a set of inferential insights stored in an insight database as a function of the correlation,
      where the inferential insights consist of learning algorithms, which define steps by which the processor self-learns how to more effectively improve storage performance, and a set of storage-management models, and
      where the processor uses the inferential insights to intelligently determine when to migrate data elements, of the set of data elements, between distinct tiers of the set of tiers; and
migrating the first data element to a second storage device,
  where the migrating is performed as a function of the associating,
  where the second storage device is associated with a second tier of the set of tiers, and
  where the first tier and the second tier are distinct.

2. The system of claim 1,
where the first user's degree of satisfaction is unfavorable, and
where the second storage device is capable of higher performance than the first storage device.

3. The system of claim 1, where the operations further comprise:
identifying a second metadata set that is associated with a second data element of the set of data elements;
determining that the first metadata set and the second metadata set share a common subset of metadata values; and
migrating the second data element to the second storage device as a function of the determining.

4. The system of claim 3, where the operations further comprise:
receiving additional feedback from a plurality of users,
  where the additional feedback identifies multiple sets of user feedback, and
  where each of the multiple sets of user feedback identifies a degree of satisfaction, of a distinct user of the plurality of users, with the hierarchical storage-management system's response to the distinct user's request to access one or more data elements of the set of data elements;
updating a training procedure of the cognitive hierarchical storage-management system by associating each metadata set of the multiple sets with a corresponding data element of the set of data elements; and
migrating a subset of the one or more data elements from one tier of the set of tiers to a different tier of the set of tiers, where the migrating is performed as a function of the identifications of the first and the second metadata sets and as a further function of the associating each metadata set of the multiple sets with the corresponding data element.

5. The system of claim 1, where the migrating comprises directing a storage controller device of the cognitive hierarchical storage-management system to physically move the first data element from the first storage device to the second storage device.

6. The system of claim 1, where the associating comprises:
   encoding the first user's degree of satisfaction as an additional metadata element;
   incorporating the additional metadata element into the first metadata set; and
   submitting the first metadata set as an input vector to a neural network of a machine-learning module of the cognitive hierarchical storage-management system.

7. The system of claim 6, where the associating further comprises:
   receiving, in response to the submitting, an output of the neural network that identifies the second storage device.

8. A method for optimizing user satisfaction when training a cognitive hierarchical storage-management system, the method comprising:
   receiving, by the processor, feedback from a first user that describes the first user's degree of satisfaction with the hierarchical storage-management system's response to a first data-access request,
      where the first data-access request comprises the first user's request to the hierarchical storage-management system for access to a first data element of a set of data elements, and
      where the response comprises providing, to the first user, access to a copy of the first data element stored on a first storage device of a set of storage devices, the first storage device being associated with a first tier of a set of tiers of a tiered storage environment managed by the hierarchical storage-management system;
   identifying a first metadata set associated with the first data element;
   associating the first metadata set with the first user's degree of satisfaction,
      where the associating comprises:
         inferring meaning from a pattern of metadata values of the first metadata set, where the meaning consists of a correlation between a degree of user satisfaction and at least one metadata value of the first metadata set,
         updating a set of inferential insights stored in an insight database as a function of the correlation, where the inferential insights consist of learning algorithms, which define steps by which the processor self-learns how to more effectively improve storage performance, and a set of storage-management models, and
         where the processor uses the inferential insights to intelligently determine when to migrate data elements, of the set of data elements, between distinct tiers of the set of tiers; and
   migrating the first data element to a second storage device,
      where the migrating is performed as a function of the associating,
      where the second storage device is associated with a second tier of the set of tiers, and
      where the first tier and the second tier are distinct.

9. The method of claim 8,
   where the first user's degree of satisfaction is unfavorable, and
   where the second storage device is capable of higher performance than the first storage device.

10. The method of claim 8, where the method further comprises:
   identifying a second metadata set that is associated with a second data element of the set of data elements;
   determining that the first metadata set and the second metadata set share a common subset of metadata values; and
   migrating the second data element to the second storage device as a function of the determining.

11. The method of claim 10, where the method further comprises:
   receiving additional feedback from a plurality of users,
      where the additional feedback identifies multiple sets of user feedback, and
      where each of the multiple sets of user feedback identifies a degree of satisfaction, of a distinct user of the plurality of users, with the hierarchical storage-management system's response to the distinct user's request to access one or more data elements of the set of data elements;
   updating a training procedure of the cognitive hierarchical storage-management system by associating each metadata set of the multiple sets with a corresponding data element of the set of data elements; and
   migrating a subset of the one or more data elements from one tier of the set of tiers to a different tier of the set of tiers, where the migrating is performed as a function of the identifications of the first and the second metadata sets and as a further function of the associating each metadata set of the multiple sets with the corresponding data element.

12. The method of claim 8, where the migrating comprises directing a storage controller device of the cognitive hierarchical storage-management system to physically move the first data element from the first storage device to the second storage device.

13. The method of claim 8, where the associating comprises:
   encoding the first user's degree of satisfaction as an additional metadata element;
   incorporating the additional metadata element into the first metadata set;
   submitting the first metadata set as an input vector to a neural network of a machine-learning module of the cognitive hierarchical storage-management system; and
   receiving, in response to the submitting, an output of the neural network that identifies the second storage device.

14. The method of claim 8, further comprising providing at least one support service for at least one of creating, integrating, hosting, maintaining, and deploying computer-readable program code in the storage-management system, wherein the computer-readable program code in combination with the cognitive hierarchical storage-management system is configured to implement the receiving, the identifying, the associating, and the migrating.

15. A computer program product, comprising a computer-readable hardware storage device storing computer-readable program code, the program code configured to be executed by a processor of a cognitive hierarchical storage-management system comprising the processor and a memory coupled to the processor to implement operations for optimizing user satisfaction when training the cognitive hierarchical storage-management system, the operations comprising:
receiving, by the processor, feedback from a first user that describes the first user's degree of satisfaction with the hierarchical storage-management system's response to a first data-access request,
where the first data-access request comprises the first user's request to the hierarchical storage-management system for access to a first data element of a set of data elements, and
where the response comprises providing, to the first user, access to a copy of the first data element stored on a first storage device of a set of storage devices, the first storage device being associated with a first tier of a set of tiers of a tiered storage environment managed by the hierarchical storage-management system;
a tiered storage environment managed by the hierarchical storage-management system;
identifying a first metadata set associated with the first data element;
associating the first metadata set with the first user's degree of satisfaction,
where the associating comprises:
inferring meaning from a pattern of metadata values of the first metadata set, where the meaning consists of a correlation between a degree of user satisfaction and at least one metadata value of the first metadata set,
updating a set of inferential insights stored in an insight database as a function of the correlation,
where the inferential insights consist of learning algorithms, which define steps by which the processor self-learns how to more effectively improve storage performance, and a set of storage-management models, and
where the processor uses the inferential insights to intelligently determine when to migrate data elements, of the set of data elements, between distinct tiers of the set of tiers; and
migrating the first data element to a second storage device,
where the migrating is performed as a function of the associating,
where the second storage device is associated with a second tier of the set of tiers, and
where the first tier and the second tier are distinct.

16. The computer program product of claim 15,
where the first user's degree of satisfaction is unfavorable, and
where the second storage device is capable of higher performance than the first storage device.

17. The computer program product of claim 15, where the operations further comprise:
identifying a second metadata set that is associated with a second data element of the set of data elements;
determining that the first metadata set and the second metadata set share a common subset of metadata values; and
migrating the second data element to the second storage device as a function of the determining.

18. The computer program product of claim 17, where the operations further comprise:
receiving additional feedback from a plurality of users,
where the additional feedback identifies multiple sets of user feedback, and
where each of the multiple sets of user feedback identifies a degree of satisfaction, of a distinct user of the plurality of users, with the hierarchical storage-management system's response to the distinct user's request to access one or more data elements of the set of data elements;
updating a training procedure of the cognitive hierarchical storage-management system by associating each metadata set of the multiple sets with a corresponding data element of the set of data elements; and
migrating a subset of the one or more data elements from one tier of the set of tiers to a different tier of the set of tiers, where the migrating is performed as a function of the identifications of the first and the second metadata sets and as a further function of the associating each metadata set of the multiple sets with the corresponding data element.

19. The computer program product of claim 15, where the migrating comprises directing a storage controller device of the cognitive hierarchical storage-management system to physically move the first data element from the first storage device to the second storage device.

20. The computer program product of claim 15, where the associating comprises:
encoding the first user's degree of satisfaction as an additional metadata element;
incorporating the additional metadata element into the first metadata set;
submitting the first metadata set as an input vector to a neural network of a machine-learning module of the cognitive hierarchical storage-management system; and
receiving, in response to the submitting, an output of the neural network that identifies the second storage device.

* * * * *